I. H. HODGDON.
Horse-Blanket.

No. 199,292.    Patented Jan. 15, 1878.

UNITED STATES PATENT OFFICE.

ISRAEL H. HODGDON, OF GRAY, MAINE, ASSIGNOR TO HIMSELF AND WILLIAM BEATTY, OF SAME PLACE.

IMPROVEMENT IN HORSE-BLANKETS.

Specification forming part of Letters Patent No. 199,292, dated January 15, 1878; application filed November 26, 1877.

*To all whom it may concern:*

Be it known that I, ISRAEL H. HODGDON, of Gray, in the county of Cumberland, in the State of Maine, have invented a certain new and useful Improvement in Horse or other Blankets, of which the following is a specification:

This invention consists in the combination of cords or lines with a blanket, more particularly horse-blankets, and in a manner substantially as hereinafter described, whereby said cords, when tied or otherwise fastened to secure the blanket on the horse, the strain practically is sustained by the cords and not by the blanket, and the blanket is held most securely against accidental detachment under the movements of the horse, and also made most completely and closely to cover the horse.

Figure 1:
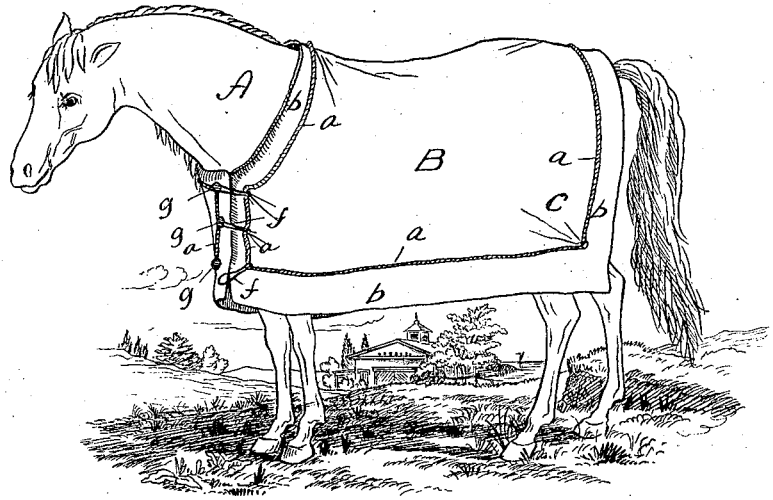
Figure 2:
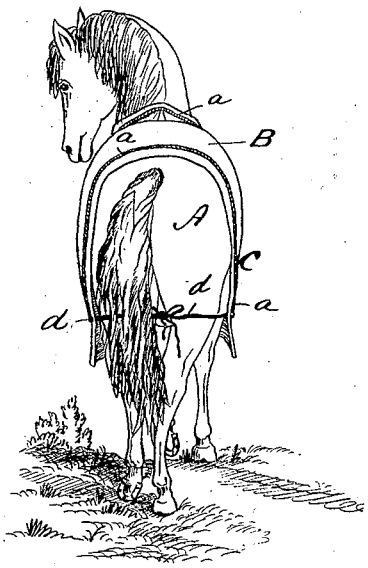

In the accompanying plate of drawings, Figures 1 and 2 are perspective views, showing my improved blanket in use.

In the drawings, A represents the figure of a horse covered by a blanket, B; $a$, a cord, stitched or otherwise fastened around the whole length of the blanket, near its edge $b$, and at the corners is formed into loops, which are passed through suitably-faced holes cut in the blanket. These loops serve as a secure fastening of the blanket across the breast and behind the haunches of the horse, leaving the corner of the blanket to hang free.

If desired, the loops at the corners may project only slightly through the blanket, and have small single cords or straps attached thereto for fastening the blanket.

The cord $a$, at the breast part D of the blanket, has also loops $f$ and buttons $g$ for closely fastening the blanket together about the breast of the horse; or, instead of the loops and buttons, loose ends of cord fastened to the cord $a$ may be used, and tied together.

A combination of a cord with a blanket, as above described, and shown in the drawings, secures a most perfect fastening of a blanket to and about a horse, and practically relieves it of all strain.

Having thus described my invention, what I claim, and desire to secure by Letters Patent, is—

The blanket having a cord firmly attached entirely around it near its edges, and formed into loops, which project through suitably-faced holes in the corners thereof, substantially as and for the purpose set forth.

ISRAEL H. HODGDON.

Witnesses:
 EDW. A. MARR,
 JACOB CLARK.